United States Patent
Ohshima (10) Patent No.: US 8,461,793 B2
(45) Date of Patent: Jun. 11, 2013

(54) MOTOR LOAD CONTROL APPARATUS

(75) Inventor: Shunzou Ohshima, Kosai (JP)

(73) Assignee: Yazaki Corporation, Tokyo (JP)

(\*) Notice: Subject to any disclaimer, the term of this patent is extended or adjusted under 35 U.S.C. 154(b) by 340 days.

(21) Appl. No.: 12/918,577

(22) PCT Filed: Feb. 20, 2009

(86) PCT No.: PCT/JP2009/052965
§ 371 (c)(1),
(2), (4) Date: Aug. 20, 2010

(87) PCT Pub. No.: WO2009/104713
PCT Pub. Date: Aug. 27, 2009

(65) Prior Publication Data
US 2010/0327794 A1    Dec. 30, 2010

(30) Foreign Application Priority Data

Feb. 20, 2008 (JP) ................. 2008-039080

(51) Int. Cl.
*H02P 1/30* (2006.01)
*H02P 3/00* (2006.01)
(52) U.S. Cl.
USPC ............... 318/503; 318/400.08; 318/400.13; 318/400.17; 327/423; 327/427
(58) Field of Classification Search
USPC .......... 318/503, 727, 400.08, 400.13, 400.17, 318/400.26, 400, 13; 327/108, 110, 536, 327/538; 323/222, 282; 363/132
See application file for complete search history.

(56) References Cited

U.S. PATENT DOCUMENTS

| | | | | |
|---|---|---|---|---|
| 4,804,892 A | * | 2/1989 | Muller | 318/400.17 |
| RE34,609 E | * | 5/1994 | Mueller | 318/400.08 |
| 5,408,150 A | * | 4/1995 | Wilcox | 327/108 |

(Continued)

FOREIGN PATENT DOCUMENTS

| JP | 62-138081 A | 6/1987 |
|---|---|---|
| JP | 1-315292 A | 12/1989 |

(Continued)

OTHER PUBLICATIONS

International Search Report (PCT/ISA/210) for PCT/JP2009/052965; dated Mar. 17, 2009.

(Continued)

*Primary Examiner* — Paul Ip
(74) *Attorney, Agent, or Firm* — Sughrue Mion, PLLC (57) ABSTRACT

A motor load control apparatus capable of suppressing heat generation of an electronic switch and suppressing occurrence of noise associated with rotation of a fan and vibration of the fan is provided. A switch section (17) in which a first electronic switch (T1) and a second electronic switch (T2) are connected in parallel is provided, and the first electronic switch (T1) is driven by a PWM signal with a predetermined duty ratio and a predetermined frequency and the second electronic switch (T2) is driven in a state of delaying the PWM signal by which the first electronic switch (T1) is driven by a predetermined time. Consequently, as compared with the case of one electronic switch, a heating value of each of the electronic switches can be reduced and radiation measures of the whole apparatus can be reduced. Further, noise or vibration occurring by PWM control can be reduced by changing delay time at random.

2 Claims, 7 Drawing Sheets

U.S. PATENT DOCUMENTS

| | | | |
|---|---|---|---|
| RE37,589 E * | 3/2002 | Mueller | 318/400.26 |
| 6,466,391 B1 * | 10/2002 | Lee et al. | 360/75 |
| 6,556,053 B2 * | 4/2003 | Stanley | 327/108 |
| 6,577,173 B2 * | 6/2003 | Ikezawa | 327/110 |
| 6,593,781 B2 * | 7/2003 | Yoshimura | 327/110 |
| 6,674,268 B2 * | 1/2004 | Rutter et al. | 323/224 |
| 6,847,532 B2 * | 1/2005 | Villaret | 363/132 |
| 6,903,535 B2 * | 6/2005 | Liu et al. | 323/222 |
| 7,746,042 B2 * | 6/2010 | Williams et al. | 323/223 |
| 7,800,350 B2 * | 9/2010 | Pigott | 323/271 |
| 7,884,583 B2 * | 2/2011 | Lenz et al. | 323/222 |
| 8,030,994 B2 * | 10/2011 | Hoogzaad | 330/10 |
| 2002/0105311 A1 * | 8/2002 | Rutter et al. | 323/283 |
| 2002/0109477 A1 * | 8/2002 | Ikezawa | 318/727 |
| 2002/0125920 A1 * | 9/2002 | Stanley | 327/108 |
| 2003/0112040 A1 * | 6/2003 | Yoshimura | 327/110 |
| 2003/0193364 A1 * | 10/2003 | Liu et al. | 327/536 |
| 2004/0027760 A1 * | 2/2004 | Villaret | 361/94 |
| 2005/0285582 A1 | 12/2005 | Azuma et al. | |
| 2007/0001742 A1 * | 1/2007 | Ishikawa et al. | 327/423 |
| 2007/0200613 A1 * | 8/2007 | Ishikawa et al. | 327/427 |
| 2008/0084197 A1 * | 4/2008 | Williams et al. | 323/282 |
| 2008/0278125 A1 * | 11/2008 | Pigott | 323/271 |
| 2009/0033261 A1 * | 2/2009 | Acquaviva | 318/400.13 |
| 2009/0045764 A1 * | 2/2009 | Hoogzaad | 318/503 |
| 2009/0322407 A1 * | 12/2009 | Lenz et al. | 327/419 |
| 2010/0289560 A1 * | 11/2010 | Mavencamp et al. | 327/538 |

FOREIGN PATENT DOCUMENTS

| | | |
|---|---|---|
| JP | 2005-057883 A | 3/2005 |
| JP | 2005-080384 A | 3/2005 |
| JP | 2006-14449 A | 1/2006 |

OTHER PUBLICATIONS

Japanese Office Action, dated Feb. 15, 2013, issued by the Japanese Patent Office in counterpart Japanese Application No. 2008-039080.

* cited by examiner

MOTOR LOAD CONTROL APPARATUS

TECHNICAL FIELD

The present invention relates to a motor load control apparatus for actuating an electronic switch having semiconductor elements by PWM control and driving a load connected to the electronic switch, and particularly to a technique for suppressing occurrence of noise, vibration or heat generation.

BACKGROUND ART

For example, a radiator fan mounted in a vehicle is controlled so that the number of rotations is controlled according to a temperature of engine cooling water and when the temperature of engine cooling water is low, the number of rotations is decreased in order to reduce noise and when the temperature of engine cooling water becomes high, the number of rotations is increased in order to enhance a cooling effect (for example, Patent Reference 1).

Figure 7:
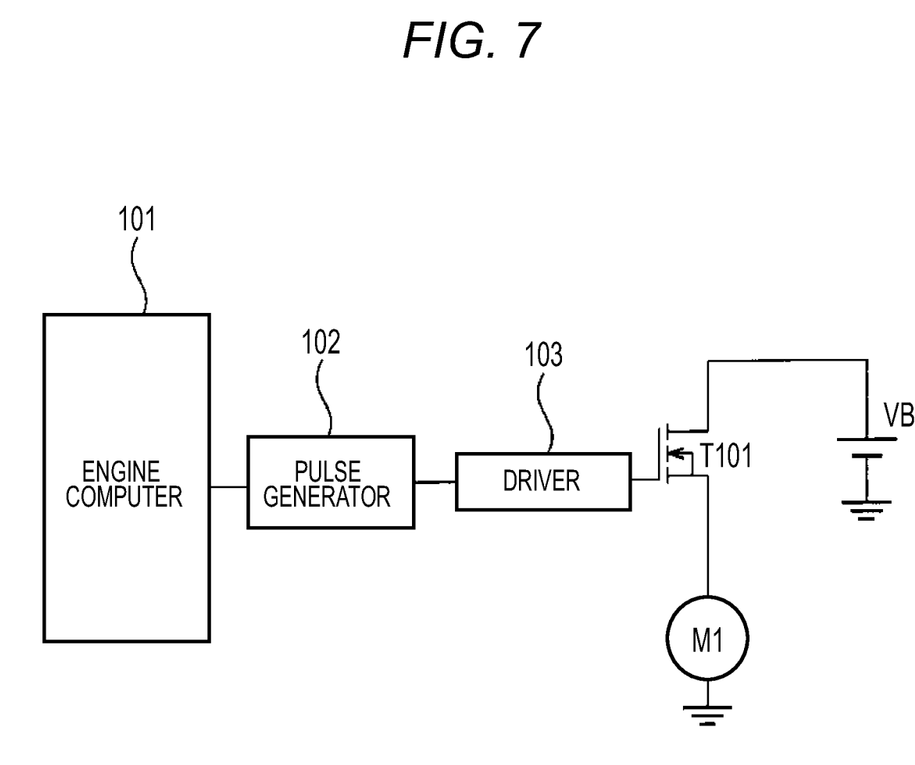
FIG. 7 is a circuit diagram showing a configuration of a conventional motor load control apparatus.

FIG. 7 is a circuit diagram showing a conventional example of a load control circuit for driving a motor M1 for radiator fan driving. As shown in FIG. 7, the motor M1 is connected to a battery VB through an electronic switch (T101) such as a MOSFET. Also, the load control circuit includes an engine computer 101, a pulse generator 102 and a driver 103, and when a rotation command signal of the motor M1 according to a temperature of engine cooling water is output from the engine computer 101 to the pulse generator 102, a PWM signal with a desired duty ratio is generated by the pulse generator 102. That is, when the temperature of engine cooling water is low, a PWM signal with a short on time (that is, a low duty ratio) is generated and when the temperature of engine cooling water is high, a PWM signal with a long on time (that is, a high duty ratio) is generated.

Then, the driver 103 outputs the PWM signal generated by the pulse generator 102 to a control terminal (a gate in the case of the MOSFET) of the electronic switch (T101).

As a result of that, the electronic switch (T101) performs an on-off action by the supplied PWM signal and electric power is supplied to the motor M1 and the motor M1 is rotated by a desired number of rotations. That is, the motor M1 is rotated and driven by the number of rotations according to a temperature of engine cooling water.

Here, a frequency of a PWM signal output from the pulse generator 102 is set at a high frequency of about 19 [KHz] greater than a human audio frequency. Also, when the frequency of the PWM signal is set high, a heating value generated for a transitional period at the time when the electronic switch (T101) performs an on-off action becomes large, so that the electronic switch (T101) is stored inside a unit having a radiation fin. Further, the radiation fin is installed in a place with good air permeability.

Patent Reference 1: JP-A-2005-80384

DISCLOSURE OF THE INVENTION

Problems that the Invention is to Solve

In the conventional motor load control apparatus as described above, PWM control of the electronic switch (T101) is performed at a frequency greater than the audio frequency, so that a heating value of the electronic switch (T101) becomes large. As a result of this, it is necessary to use an electronic switch with good heat resistance and also a cooling structure for cooling the electronic switch is required, so that problems that the whole apparatus is upsized and an increase in cost associated with upsizing occurs and further a ground place is limited occur.

In order to solve the problems described above, a frequency of PWM control could be decreased, but vibration or noise may occur due to variations in rotation of a fan when the frequency is decreased.

The invention has been implemented to solve such conventional problems, and an object of the invention is to provide a motor load control apparatus capable of suppressing heat generation of an electronic switch and further suppressing occurrence of noise associated with rotation of a fan and vibration of the fan.

Means for Solving the Problems

A motor load control apparatus according to the invention is a motor load control apparatus for supplying electric power output from a power source to a motor load by PWM control to drive the motor load, comprising: a switch section provided in a circuit for connecting the power source to the motor load; and a PWM control section that drives the switch section by a PWM signal, wherein the switch section includes a first electronic switch and a second electronic switch which are connected in parallel; and wherein the PWM control section drives the first electronic switch by the PWM signal and drives the second electronic switch by a signal which is delayed from the PWM signal by a predetermined delay time.

Preferably, the PWM control section changes the delay time every each period.

Preferably, the PWM control section stops driving of the first electronic switch and drives only the second electronic switch in a case of decreasing a rotation number of the motor load.

Advantage of the Invention

In a motor load control apparatus according to the invention, PWM control of a motor load is performed at a predetermined duty ratio using the switch section in which plural electronic switches are connected in parallel, so that a frequency at which each of the electronic switches is driven can be set at a frequency lower than the case of one electronic switch and a lower duty ratio can be used. As a result of this, a heating value of each of the electronic switches can be reduced and a radiation structure can be simplified than the prior technique.

Also, when PWM control section changes delay time every each period, a frequency of a PWM signal for controlling a motor load changes at random, so that a resonance point of noise or vibration can be shifted and occurrence of noise or vibration can be suppressed.

Also, when the rotation number of the motor load is decreased, driving of a first electronic switch is stopped, so that occurrence of noise or vibration can be controlled.

DESCRIPTION OF REFERENCE NUMERALS AND SIGNS

11 ENGINE COMPUTER
12 PULSE GENERATOR
13 DELAY CIRCUIT
14 FIRST DRIVER
15 SECOND DRIVER
16 RANDOM SIGNAL GENERATOR
17 SWITCH SECTION
M1 MOTOR
T1 FIRST ELECTRONIC SWITCH
T2 SECOND ELECTRONIC SWITCH
VB BATTERY

BEST MODE FOR CARRYING OUT THE INVENTION

Figure 1:
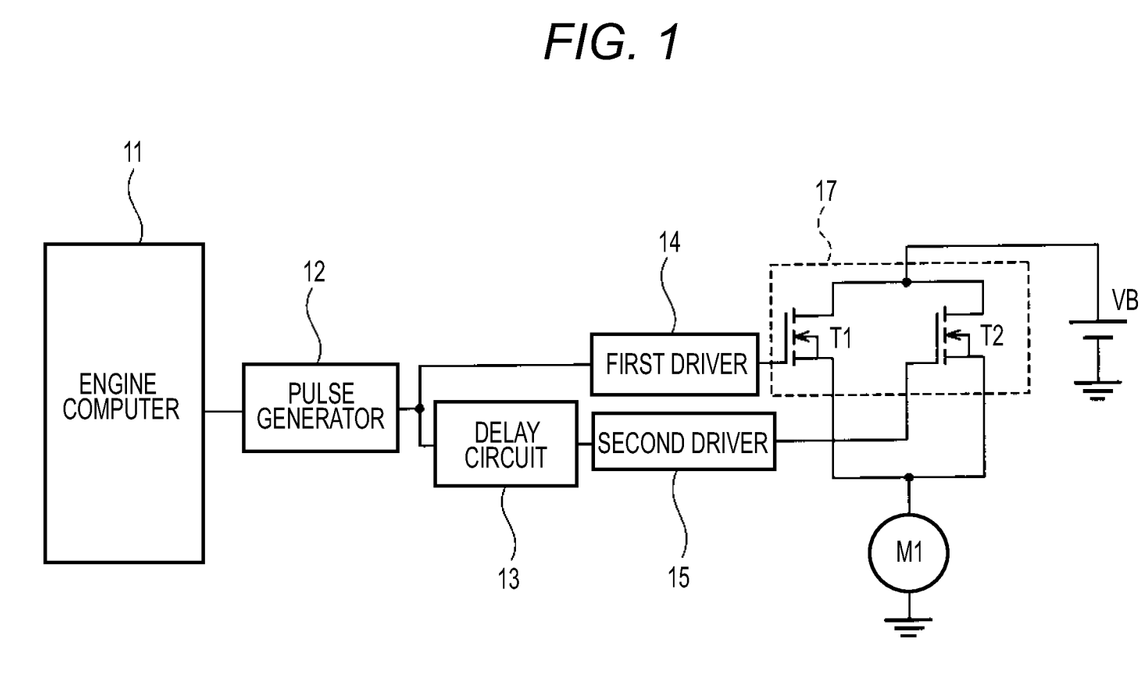
FIG. 1 is a circuit diagram showing a configuration of a motor load control apparatus according to a first embodiment of the invention.

Embodiments of the invention will hereinafter be described based on the drawings. FIG. 1 is a circuit diagram showing a configuration of a motor load control apparatus according to a first embodiment of the invention, and explanation will hereinafter be given by taking a motor for driving of a radiator fan mounted in a vehicle as one example of a motor load and by taking a battery mounted in a vehicle as one example of a power source.

As shown in FIG. 1, the motor load control apparatus according to the first embodiment has a switch section 17 disposed between a motor M1 and a battery VB. Further, the motor load control apparatus includes an engine computer 11, a pulse generator 12 connected to the engine computer 11, a delay circuit 13 disposed in the output side of this pulse generator 12, a first driver 14 and a second driver 15.

The switch section 17 has a first electronic switch (T1) and a second electronic switch (T2) made of, for example, a MOSFET mutually connected in parallel. That is, when at least one of the first electronic switch (T1) and the second electronic switch (T2) is turned on, electric power output from the battery VB is supplied to the motor M1.

The engine computer 11 controls an engine mounted in a vehicle, and a temperature detection signal by a thermometer (not shown) for detecting a temperature of engine cooling water is input and a rotation command signal of the motor M1 is output to the pulse generator 12 based on the temperature detection signal.

The pulse generator 12 generates a PWM signal based on the rotation command signal when the rotation command signal is input. In this case, the pulse generator 12 generates a PWM signal with a duty ratio which is equal to one-half of a duty ratio necessary to rotate and drive the motor M1 by a desired number of rotations. Then, the generated PWM signal is output to the first driver 14 and the delay circuit 13.

The delay circuit 13 delays a PWM signal output from the pulse generator 12 by a predetermined delay time td, and outputs the delayed PWM signal to the second driver 15.

Then, the first driver 14 drives the first electronic switch (T1) by a PWM signal output from the pulse generator 12, and the second driver 15 drives the second electronic switch (T2) by a PWM signal output from the pulse generator 12 and delayed by the predetermined delay time td by the delay circuit 13.

Next, an operation of the motor load control apparatus according to the first embodiment including the above configuration will be described with reference to timing charts shown in FIGS. 2 and 3.

Figure 2:
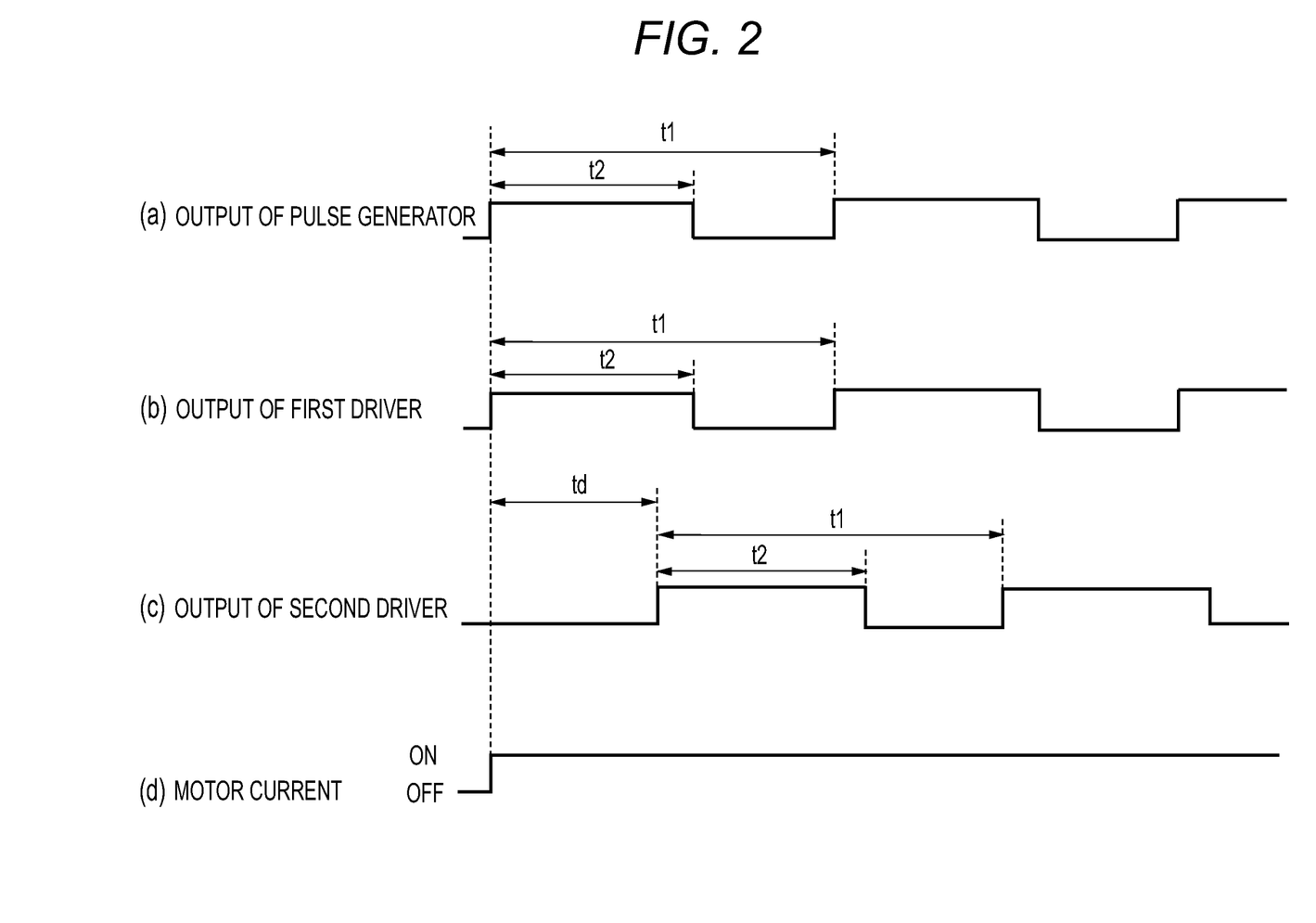
FIG. 2 is a timing chart showing a change in each signal in the case of passing a motor current of a duty ratio of 100% in accordance with the motor load control apparatus according to the first embodiment of the invention.

FIG. 2 is a timing chart showing a change in each signal at the time of driving the motor M1 at a duty ratio of 100%, and FIG. 2(a) shows a PWM signal output from the pulse generator 12, and FIG. 2(b) shows an output signal of the first driver 14, and FIG. 2(c) shows an output signal of the second driver 15, and FIG. 2(d) shows a current flowing through the motor M1.

Then, when a PWM signal of a duty ratio at which on time becomes t2 (t2>t1;2) in a period t1 of a PWM signal is output from the pulse generator 12 as shown in FIG. 2(a), an output signal of the first driver 14 becomes the same signal as the PWM signal output from the pulse generator 12 as shown in FIG. 2(b) and also, an output signal of the second driver 15 becomes a signal which is delayed from the PWM signal output from the pulse generator 12 by a predetermined delay time td as shown in FIG. 2(c).

Therefore, at least one of the first electronic switch (T1) and the second electronic switch (T2) always becomes an on state, so that electric power output from the battery VB is always supplied to the motor M1 and a current flowing through the motor M1 becomes a current of a duty ratio of 100% as shown in FIG. 2(d).

Figure 3:
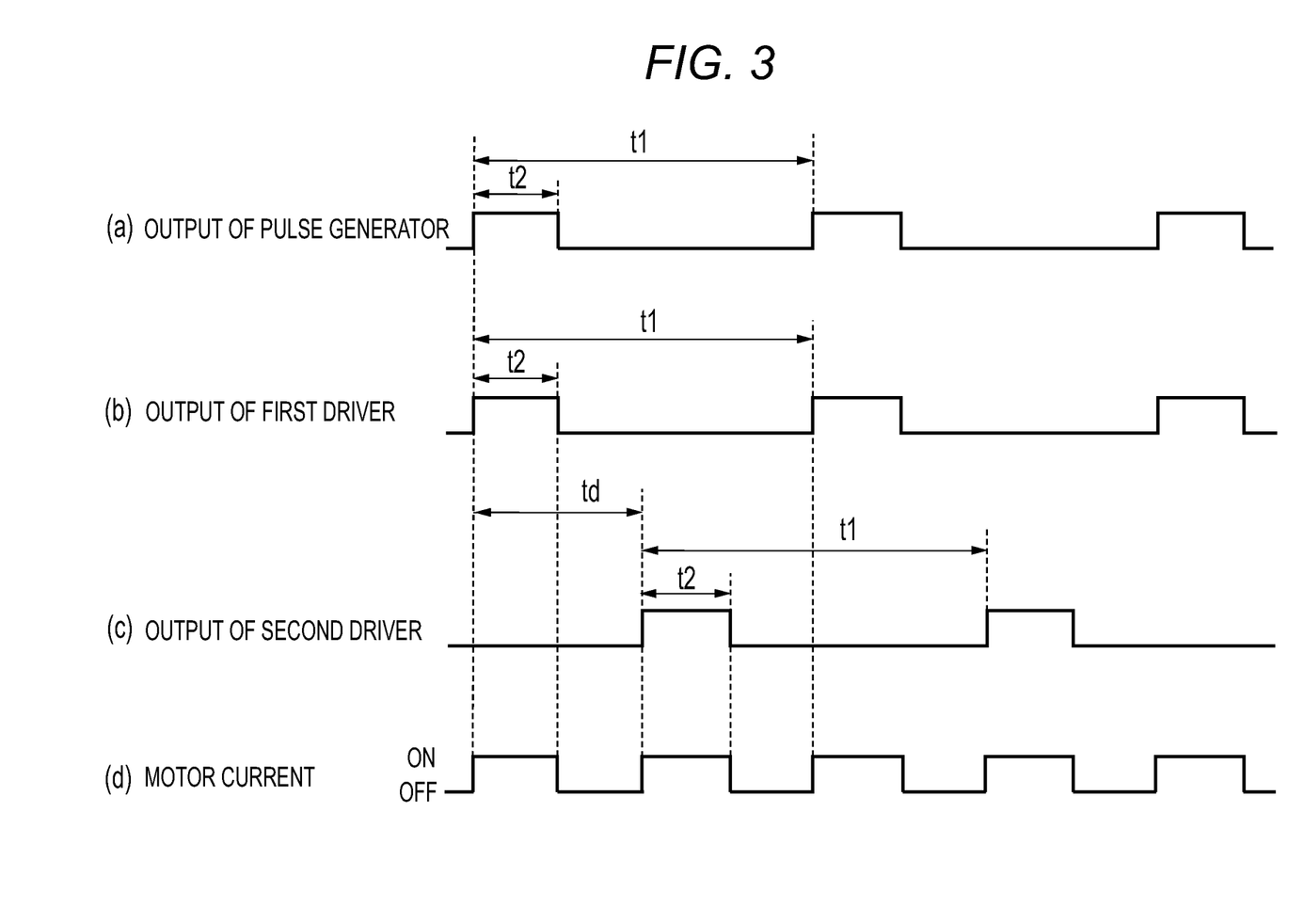
FIG. 3 is a timing chart showing a change in each signal in the case of passing a motor current of a duty ratio of 50% in accordance with the motor load control apparatus according to the first embodiment of the invention.

FIG. 3 is a timing chart showing a change in each signal at the time of driving the motor M1 at a duty ratio of 50%, and FIG. 3(a) shows a PWM signal output from the pulse generator 12, and FIG. 3(b) shows an output signal of the first driver 14, and FIG. 3(c) shows an output signal of the second driver 15, and FIG. 3(d) shows a current flowing through the motor M1.

Then, when a PWM signal of a duty ratio at which on time becomes t2 (t2=t1;4) in a period t1 of a PWM signal is output from the pulse generator 12 as shown in FIG. 3(a), an output signal of the first driver 14 becomes the same signal as the PWM signal output from the pulse generator 12 as shown in FIG. 3(b) and an output signal of the second driver 15 becomes a signal in which the PWM signal output from the pulse generator 12 is delayed by a predetermined delay time td (td=2*t2) as shown in FIG. 3(c).

Therefore, the first electronic switch (T1) is driven by a PWM signal of a duty ratio of 25% and the second electronic switch (T2) is also driven by a PWM signal of a duty ratio of 25% and timing of on of each of the electronic switches (T1), (T2) does not match, so that when a current flowing through the first electronic switch (T1) is added to a current flowing through the second electronic switch (T2), a current of a duty ratio of 50% in total flows through the motor M1.

Then, as can be seen from the timing chart shown in FIG. 3, a period of each of the electronic switches (T1), (T2) is t1, that is, a driving frequency is (1/t1) and a period of a current flowing through a motor current is t1;2, that is, a frequency is (2/t1), so that the motor M1 is driven at a frequency which is equal to two times a frequency at which each of the electronic switches (T1), (T2) is driven.

Therefore, when a motor current is driven at a frequency of 19 [KHz], each of the electronic switches (T1), (T2) could be driven at a frequency of 9.5 [KHz] (one-half 19 [KHz]) and also when the motor current is driven at a duty ratio of 50%, each of the electronic switches (T1), (T2) could be driven at a duty ratio of 25% (one-half 50%).

Therefore, a heating value of each of the electronic switches (T1), (T2) becomes ½ in contrast with the conventional electronic switch (T101) shown in FIG. 7. As a result of this, the heating value of a total of the electronic switches (T1), (T2) becomes equal to that of the conventional electronic switch (T101), but heat generation can be dissipated, so that a radiation structure can be simplified as a whole and space-saving and miniaturization of the whole apparatus can be achieved.

Figure 4:
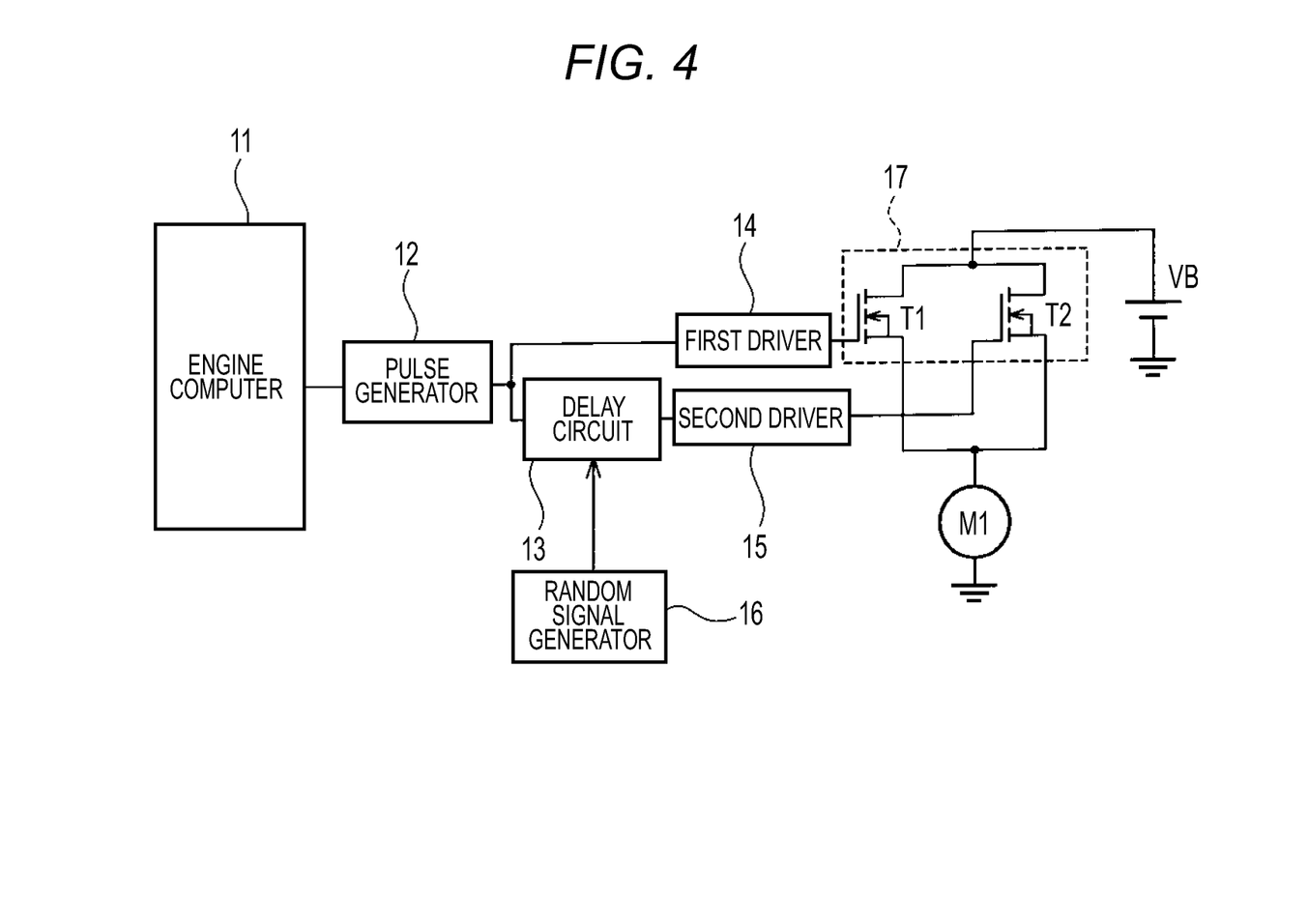
FIG. 4 is a circuit diagram showing a configuration of a motor load control apparatus according to a second embodiment of the invention.

Next, a second embodiment of the invention will be described. FIG. 4 is a circuit diagram showing a configuration of a motor load control apparatus according to the second embodiment. As shown in FIG. 4, the second embodiment differs from the first embodiment shown in FIG. 1 in that the second embodiment includes a random signal generator 16. Since the other configuration is the same as the configuration shown in FIG. 1, its configuration explanation is omitted by assigning the same numerals.

The random signal generator 16 outputs a change amount setting signal for deciding delay time td in a delay circuit 13 every each period of a pulse signal output from a pulse generator 12. Concretely, a change range α ("α" includes plus and minus cases) with respect to (t1;2) which is one-half a period t1 is decided at random and this change range α is output to the delay circuit 13 as the change amount setting signal.

The delay circuit 13 decides the delay time td based on the change range α output from the random signal generator 16. That is, when the change ranges α decided every each period are set at α1, α2, α3, . . . , the delay times td are changed at random as shown by (t1;2)+α1, (t1;2)+α2, (t1;2)+α3, . . . . In addition, each of the change ranges α1, α2, α3, . . . is set so that an average value of the delay times td becomes one-half the period t1, that is, (t1;2).

Next, an action of the motor load control apparatus according to the second embodiment will be described with reference to timing charts shown in FIGS. 5 and 6.

Figure 5:
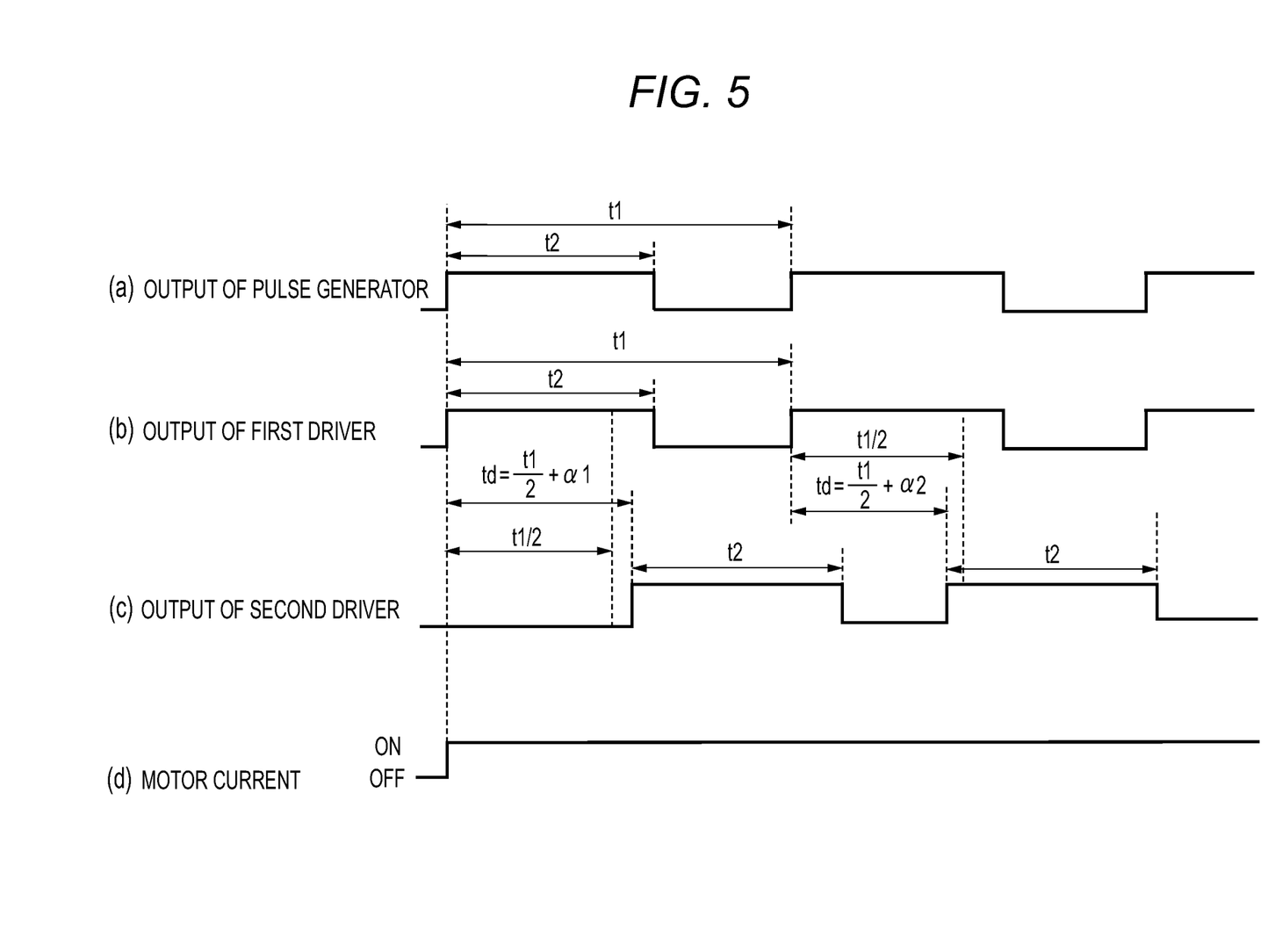
FIG. 5 is a timing chart showing a change in each signal in the case of passing a motor current of a duty ratio of 100% in accordance with the motor load control apparatus according to the second embodiment of the invention.

FIG. 5 is a timing chart showing a change in each signal at the time of driving a motor M1 at a duty ratio of 100%, and FIG. 5(a) shows a PWM signal output from the pulse generator 12, and FIG. 5(b) shows an output signal of a first driver 14, and FIG. 5(c) shows an output signal of a second driver 15, and FIG. 5(d) shows a current flowing through the motor M1.

Then, when a PWM signal of a duty ratio at which on time becomes t2 (t2>t1;2+α) in a period t1 of a PWM signal is output from the pulse generator 12 as shown in FIG. 5(a), an output signal of the first driver 14 becomes the same signal as the PWM signal output from the pulse generator 12 as shown in FIG. 5(b).

Also, an output signal of the second driver 15 becomes a signal which is delayed from the PWM signal output from the pulse generator 12 by a predetermined delay time td as shown in FIG. 5(c). In this case, the delay time td is set so as to vary every each period as described above. Therefore, generation timing of on time t2 of a PWM signal output from the second driver 15 varies every each period as shown in FIG. 5(c).

Also, setting is made so as to become t2>t1;2+α, so that at least one of the PWM signals output from the first driver 14 and the second driver 15 is turned on and at least one of a first electronic switch (T1) and a second electronic switch (T2) always becomes an on state. As a result of this, electric power output from a battery VB is always supplied to the motor M1 and a current flowing through the motor M1 becomes a current of a duty ratio of 100% as shown in FIG. 5(d).

Figure 6:
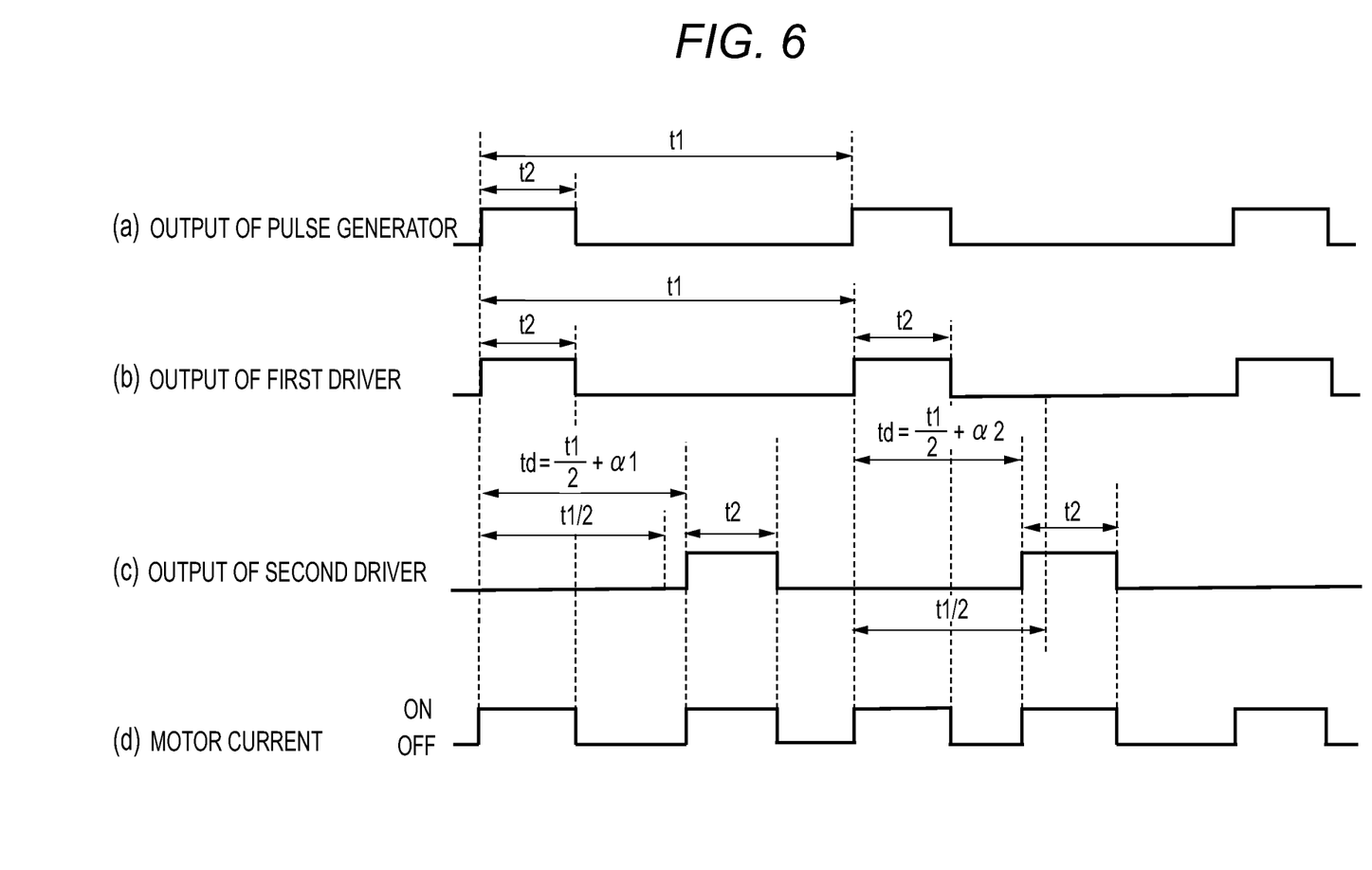
FIG. 6 is a timing chart showing a change in each signal in the case of passing a motor current of a duty ratio of 50% in accordance with the motor load control apparatus according to the second embodiment of the invention.

FIG. 6 is a timing chart showing a change in each signal at the time of driving the motor M1 at a duty ratio of 50%, and FIG. 6(a) shows a PWM signal output from the pulse generator 12, and FIG. 6(b) shows an output signal of the first driver 14, and FIG. 6(c) shows an output signal of the second driver 15, and FIG. 6(d) shows a current flowing through the motor M1.

Then, when a PWM signal of a duty ratio at which on time becomes t2 (t2=t1;4) in a period t1 of a PWM signal is output from the pulse generator 12 as shown in FIG. 6(a), an output signal of the first driver 14 becomes the same signal as the PWM signal output from the pulse generator 12 as shown in FIG. 6(b) and an output signal of the second driver 15 becomes a signal in which the PWM signal output from the pulse generator 12 is delayed by a predetermined delay time td as shown in FIG. 6(c). In this case, the delay time td is set so as to vary every each period as described above. Therefore, generation timing of on time t2 of a PWM signal output from the second driver 15 varies every each period as shown in FIG. 6(c). However, the on time t2 of the second driver 15 is generated within the period t1 and is set so as not to overlap with the on time t2 of the first driver 14.

Therefore, the first electronic switch (T1) is driven by a PWM signal of a duty ratio of 25%, but in the other second electronic switch (T2), the on time t2 is constant and the delay time td changes, so that a period differs from t1 described above and a duty ratio changes each time. However, timing of on of each of the electronic switches (T1), (T2) does not overlap, so that when a current flowing through the first electronic switch (T1) is added to a current flowing through the second electronic switch (T2), a current of a duty ratio of 50% in total flows through the motor M1 as shown in FIG. 6(d).

Also, as can be seen from FIG. 6(d), timing at which a motor current is turned on changes at random every each period. As a result of this, a period of a motor current waveform does not become (t1;2) and varies in the plus side and the minus side using (t1;2) as an average value. As a result of that, the period (frequency) is not a constant value and varies with time, so that a resonance point of noise or vibration can be shifted, and occurrence of noise or vibration can be reduced. Therefore, an effect capable of suppressing the occurrence of noise or vibration even when a frequency of a PWM signal is set at a low frequency (even when the period t1 is increased) can be achieved in addition to the effect of the first embodiment described above.

Next, a modified example of the second embodiment described above will be described. In the second embodiment described above, when it is necessary to decrease the number of rotations of the motor M1, it copes by shortening the on time (t2) during one period (t1). That is, a total of duty ratios in the case of driving two electronic switches (T1), (T2) are decreased.

Now, when on time in the case of driving two electronic switches (T1), (T2) at a certain duty ratio is set at t21, the on time t21 could be set at ½ in order to set this duty ratio at ½ (that is, one-half).

Here, even when the on time t21 is maintained and the first driver 14 or the second driver 15 is stopped, a duty ratio can be decreased to ½ and the number of rotations of the motor M1 can be decreased. Further, when the first driver 14 or the second driver 15 is stopped, the number of on-off actions of a total of each of the electronic switches (T1), (T2) during one period (t1 period) is halved, so that it is advantageous for reduction in radio noise.

However, when the first driver 14 or the second driver 15 is stopped, off duration time during the t1 period becomes long, so that variations in rotation of the motor M1 becomes large. When the second driver 15 is stopped and only the first driver 14 is driven at this time, variations in rotation of the motor M1 have periodicity, but when the first driver 14 is stopped and only the second driver 15 is driven, delay time td changes at random, so that the periodicity of variations in rotation can be disturbed and occurrence of intrinsic noise or natural vibration can be prevented.

That is, in the modified example of the second embodiment, noise or vibration occurring in the motor M1 can be suppressed by stopping the first driver 14 having periodicity and driving the second driver 15 in which the delay time td changes at random in the case of decreasing the number of rotations of the motor M1.

The motor load control apparatus of the invention has been described above based on the illustrated embodiments, but the invention is not limited to this, and a configuration of each part can be replaced with any configuration having a similar function.

The invention has been described in detail with reference to the specific embodiments, but it is apparent to those skilled in the art that various changes or modifications can be made without departing from the spirit and scope of the invention.

The present application is based on Japanese patent application (patent application No. 2008-039080) filed on Feb. 20, 2008, and the contents of the patent application are hereby incorporated by reference.

INDUSTRIAL APPLICABILITY

It is extremely useful in suppressing heat generation and suppressing occurrence of noise or vibration.

The invention claimed is:

1. A motor load control apparatus for supplying electric power output from a power source to a motor load by PWM control to drive the motor load, comprising:
   a switch section provided in a circuit for connecting the power source to the motor load;
   a PWM control section that drives the switch section by a PWM signal;
   a delay section that delays the PWM signal by a delay time; and
   a random signal generating section that changes the delay time every each period randomly,
   wherein the switch section includes a first electronic switch and a second electronic switch which are connected in parallel; and
   wherein the PWM control section drives the first electronic switch by the PWM signal and drives the second electronic switch by a signal which is randomly delayed from the PWM signal.

2. The motor load control apparatus according to claim 1, wherein the PWM control section stops driving of the first electronic switch and drives only the second electronic switch in a case of decreasing a rotation number of the motor load.

* * * * *